United States Patent

[11] 3,607,365

| | | | |
|---|---|---|---|
| [72] | Inventor | James A. Lindlof |
| | | White Bear Lake, Minn. |
| [21] | Appl. No. | 841,657 |
| [22] | Filed | May 12, 1969 |
| [23] | | Continuation of Ser. No. 492,997, |
| | | Oct. 5, 1965, abandoned |
| [45] | Patented | Sept. 21, 1971 |
| [73] | Assignee | Minnesota Mining and Manufacturing |
| | | Company |
| | | St. Paul, Minn. |

[54] VAPOR PHASE METHOD OF COATING SUBSTRATES WITH POLYMERIC COATING
10 Claims, 3 Drawing Figs.

[52] U.S. Cl. .................................................... 117/100 R,
117/100 A, 117/100 B, 117/100 C, 117/106 R,
117/DIG. 3, 260/77.5 CH
[51] Int. Cl. ...................................................... C23c 11/00,
B44d 1/00
[50] Field of Search............................................ 117/106,
72, 161 UN, 100 R, 100 A, 100 B, 100 C, DIG. 3;
260/77.5 CH

[56] References Cited
UNITED STATES PATENTS

| | | | |
|---|---|---|---|
| 2,511,544 | 6/1950 | Rinke et al..................... | 260/77.5 AQ |
| 2,662,034 | 12/1953 | Mason et al. .................. | 117/106 X |
| 2,829,981 | 4/1958 | Shapiro ......................... | 117/100 |
| 2,852,494 | 9/1958 | Lehmann et al. .............. | 260/77.5 CH |
| 3,036,930 | 5/1962 | Grimminger et al.......... | 117/106 X |
| 3,219,476 | 11/1965 | Robbins ........................ | 117/106 X |
| 3,265,730 | 8/1966 | Heubusch...................... | 260/77.5 CH |
| 3,271,185 | 9/1966 | Pollock ......................... | 117/106 X |

OTHER REFERENCES
Hudson et al. Official Digest, Feb. 1960, page 213 relied upon.

*Primary Examiner*—Alfred L. Leavitt
*Assistant Examiner*—W. E. Ball
*Attorney*—Kinney, Alexander, Sell, Steldt & Delahunt ABSTRACT: A method of providing a shaped substrate with a thin, uniform, dense, protective, polymeric coating, especially the reaction product of polyisocyanate and polyamine. The substrate is exposed to vapors of a compound having a plurality of reactive end groups, and subsequently exposed to vapors of a second compound having a plurality of radicals which are highly reactive with the end groups of the first compound. The cycle is repeated until a polymeric coating of desired thickness has been built up.

PATENTED SEP 21 1971

3,607,365

INVENTOR.
JAMES A. LINDLOF
BY
Carpenter, Kinney & Coulter
ATTORNEYS 3,607,365

VAPOR PHASE METHOD OF COATING SUBSTRATES WITH POLYMERIC COATING

This application is a continuation of copending application Ser. No. 492,997, filed Oct. 5, 1965 and now abandoned.

POLYMERIZATION METHOD AND PRODUCT

ABSTRACT OF THE DISCLOSURE

A method of providing a shaped substrate with a thin, uniform, dense, protective polymeric coating, especially the reaction product of polyisocyanate and polyamine. The substrate is exposed to vapors of a compound having a plurality of reactive end groups, and subsequently exposed to vapors of a second compound having a plurality of radicals which are highly reactive with the end groups of the first compound. The cycle is repeated until a polymeric coating of desired thickness has been built up.

Figure 1:
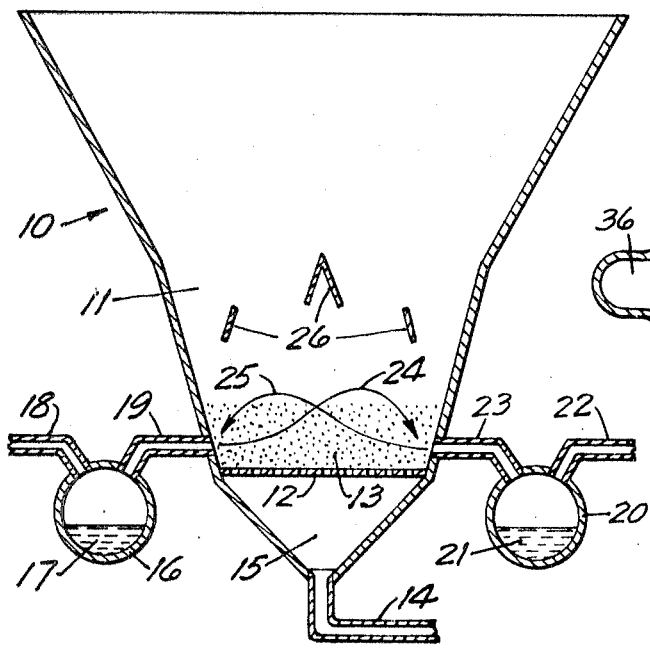

This invention relates to novel methods of coating shaped substrates, to the coated substrates themselves, and to certain novel polymers.

Some difunctional coreactive monomers which have inherently interesting properties are impossible to form at all by conventional bulk polymerization methods, particularly where the two coreactants have an extremely great, or perhaps even explosive, affinity for each other. Because of this fact, and because of the further fact that many such polymers (even if they could have been made) would have been insoluble in common solvents, no way has been known to utilize them, for coatings or any other purpose.

The present invention provides a safe, effective, and unique way of forming an unusual polymeric product directly on a shaped substrate, thereby forming a laminate or coating in situ. Polymeric coatings made in accordance with this invention have a surprisingly uniform thickness, and they are insoluble in most solvents, nearly impenetrable to most gases, even in extremely thin layers, and they display unexpected and dramatic utility. In accordance with my invention it is possible to coat almost any solid substrate -including particles having a diameter of less than 1 micron, large objects such as washers or hardware, sheet material such as polymeric films, metallic foils, paper, cloth and so on. The operation is simple, inexpensive, and may be carried out at room temperature without the use of high vacuum equipment, expensive heating units, or electrical discharge devices. Even in extremely thin layers, the highly impenetrable coatings can inhibit corrosion of metallic surfaces, prevent the passage of water vapor and provide a means of encapsulating particles to provide them with unusual utility. The polymers, which are believed to have an extremely high and narrow range of molecular weights, are characterized by their high melting point.

In accordance with my invention I expose a substrate which is to be provided with a uniform dense protective polymeric coating to the vapors of a first compound, A, having a plurality of end groups which, desirably, are reactive with the substrate. Virtually any substrate is covered with a monomolecular film of water and hence a large number of materials are able to react and form tightly adherent hydrogen bonds to the surface. Even where this does not occur there is a strong tendency for surfaces to tightly adsorb a monomolecular film of the vapors of the compound. It is my belief that individual molecules of the first compound bristle perpendicularly from the surface, in close-packed shoulder-to-shoulder arrangement by virtue of either attachment to the substrate or by hydrogen bonding to adjacent molecules. Next I expose the treated surface to the vapors of a second compound, B, having a plurality of radicals which are highly reactive with the end groups of the first compounds. Again, it appears that the molecules of the second compound extend at right angles to the surface, forming an extension to the molecules of the first compound and also displaying a high hydrogen-bonded affinity for each other within the layer. This two-step process is then repeated until the desired thickness of $(ABABAB)_n$ polymeric coating has been built up. [If desired, of course, more than two coreactive monomers can be employed, forming, e.g., an $(ABCABC)_n$ or $(ABCBABCB)_n$ polymer.] As I have indicated above, I believe this coating is highly oriented perpendicular to the surface and highly hydrogen-bonded. It is also extremely strong, protecting coated particles against rupture in processing or protecting a coated substrate against inadvertent scratching or damage. Such coatings are, however, sensitive to thermal strain, and can be ruptured by heating to a temperature somewhat above that at which they were formed. This characteristic makes coated products prepared in accordance with my invention uniquely suitable for a large variety of uses, as will be shown in greater detail.

The process of this invention finds its primary utility where a polymer is to be formed from two different monomers which react almost instantaneously to form a solid polymer. Both monomers must be vaporizable under pressure and temperatures which can reasonably be employed, and preferably are stable in air, obviating the need for special gases in the system. It is greatly preferred that the reaction yield no byproducts, and any which result must be gaseous at ambient conditions.

When coating substrates in accordance with my invention I have found it important to carefully meter each of the coreactant monomers, ideally supplying each monomer to the substrate in, or only slightly exceeding, the stoichiometric amount necessary to react with, and/or form a monomolecular layer upon, the surface which is to be coated. If a substantially greater amount of monomer is be there is a tendency to form a liquid layer of significant thickness on the substrate, the resultant coating displaying decreased density and greater porosity. Further, if the substrate is a mass of particles, they are likely to become tacky and stick together.

Figure 2:
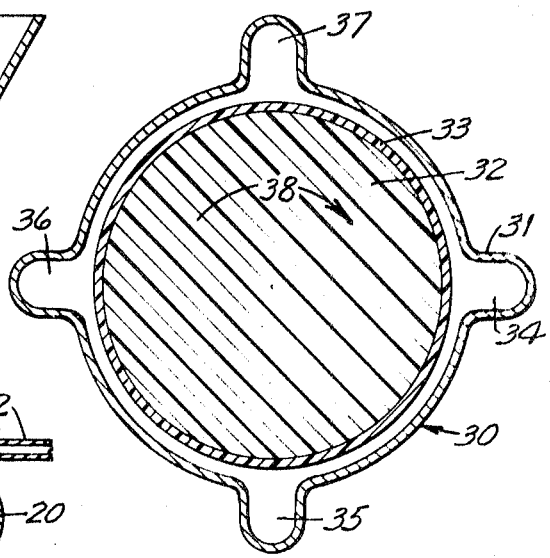
Figure 3:
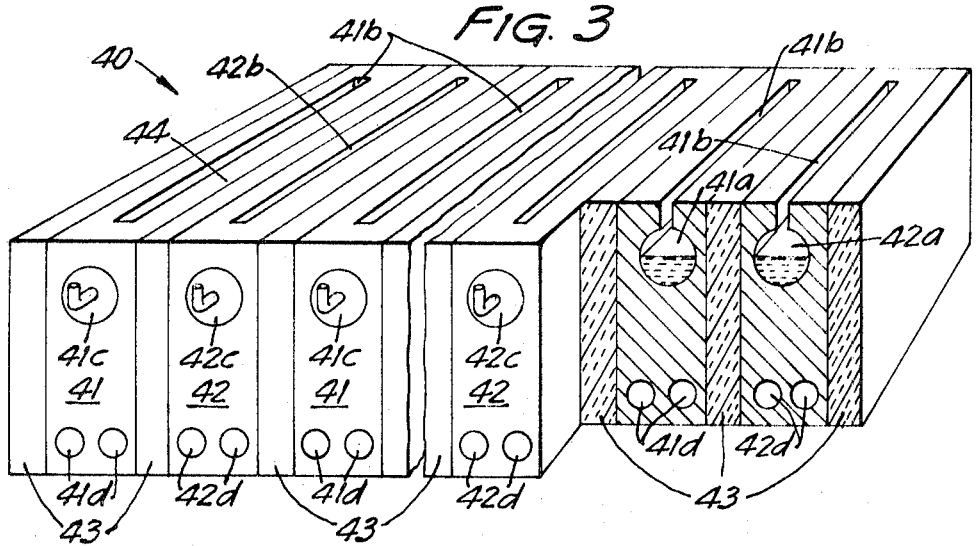

Equipment suitable for carrying out the process of my invention is shown in the attached drawings, in which:

FIG. 1 is a view in elevational cross section of an apparatus used for coating, or encapsulating, particulate matter, FIG. 2 is a view in elevational cross section of an apparatus suitable for coating sheet material, and FIG. 3 is a perspective view, shown partially in elevational cross section, of an apparatus suitable for continually coating sheet material.

In FIG. 1, fluidized bed coater 10 comprises chamber 11 having a fine screen plate 12 on its lower portion on which rests a bed of particles 13. A fluidized gas is supplied through inlet 14 to plenum chamber 15 and hence upward through plate 12. Connected to chamber 11 at one side of the fluidized bed 13 is retort 16 containing a first reactive compound 17 in liquid form. A diluent gas passes into retort 16 through inlet 18, evaporating and carrying with it vapors of first compound 17, the blend of gases flowing through vapor supply line 19 into fluidized bed 13. Connected at a point opposite to retort 16 is retort 20 containing a second reactive compound 21 in liquid form. Diluent gas passes into retort 20 through inlet 22, evaporating compound 21, and carrying the vapors thereof into fluidized bed 13 via inlet 23. Particles adjacent vapor inlet 19 tend to be moved in the direction of arrow 24, while particles adjacent vapor inlet 23 tend to move in the direction of arrow 25. The result of this arrangement is that the particles in bed 13 tend to be forced through a figure eight path, whereby they are alternately exposed to the vapors of compound 17 and the vapors of compound 21. Baffles 26 are so positioned in the upper portion of chamber 11 as to facilitate circulation and to assist in deflecting any inadvertently entrained particles. Desirably the top of chamber 11 is covered with a fine screen which permits gases to be exhausted but prevents the escape of particles which are to be, or which have been coated. An electrical charge may be provided on such a screen either to repel or to attract the particles and further hinder their escape. The rates at which compounds 17 and 21 are supplied to fluidized bed 13 are carefully controlled to provide, as nearly as possible, a stoichiometric balance between the two. The diluent gas, e.g., nitrogen, is preferably heated slightly to enhance evaporation of the reactive compounds, and both the retort and remaining supply lines may be provided with additional heating or insulative facilities to minimize any possibility of vapor condensing in the lines.

In FIG. 2, sheet coater 30 comprises chamber 31 containing sheet-bearing cylinder 32, adapted to be rotated in direction 38. A sheet of material 33 to be coated is affixed to the periphery of cylinder 32 and the cylinder rotated as indicated. Vapors of a first compound having a plurality of reactive end groups are introduced through inlet port 34, and almost instantaneously become attached to sheet 33, forming a monomolecular film of the type previously described. As cylinder 32 rotates, the thus-treated surfaces of sheet material 33 passes exhaust port 35, which removes any vapors of the first compound which have not become attached to sheet 33. As cylinder 32 continues to revolve, the treated portion of sheet 33 next passes inlet port 36, through which vapors of a second compound, having a plurality of radicals highly reactive with the end groups of the first compound are introduced. Cylinder 32 rotates further, and as the treated portion of sheet 33 passes exhaust port 37, the unused vapors of the second compound are removed. As cylinder 32 continues to revolve, the sheet is alternately exposed to vapors of the first and second compounds until the desired coating thickness is attained.

In FIG. 3, continuous coating apparatus 40 comprises hollow blocks 41 and 42, separated by insulators 43 and bolted together to form a coating face 44. Each of the blocks 41 and 42 comprises a tank portion 41a or 42a, an elongated slot 41b or 42b connecting tank 41a or 42a with coating face 44. Each end of central portion 41a or 42a is provided with a suitable fitting 41c or 42c, permitting it to be connected to other blocks. Typically, fittings 41c may be connected together to a manifold supplying a first compound having a plurality of reactive end groups, while fittings 42c may be similarly connected together to a manifold supplying a second compound having a plurality of radicals which are highly reactive with the end groups of the first compound. Blocks 41 and 42 are bored endwise to provide heating channels 41d and 42d so that, if desired, both compounds may be supplied in liquid form, and the blocks are shown in cross section, with tanks 41a and 42a containing compounds in liquid form. A roll of sheet material passing over coating face 44 is thus alternately exposed to vapors of the first compound and vapors of the second compound, thereby building up a coating in the same manner described in connection with FIG. 2.

My invention will now be described with respect to specific illustrative but nonlimiting examples.

Example 1

In this example, particles of acidic material were provided with a thin polymeric coating to render them highly resistant to water at room temperature but soluble at elevated temperatures, thereby providing a latent catalyst for various acid-catalyzed resin systems.

Seventy parts of sulfanilic acid having an average particle diameter of about 50 microns were placed in a fluidized bed coater of the type shown in FIG. 1. A 1 percent gaseous solution (mol ratio) of toluene 2,4-diisocyanate in nitrogen was introduced at one side of the fluidized bed and a similar 1 percent gaseous solution of ethylene diamine was introduced at the opposite side of the fluidized bed. After approximately 3 hours it was found that the total weight of the particles had increased by approximately 30 per cent, indicating a poly(2,4-toluene) -(1,2-ethylene) urea shell coating thickness of approximately 1-2 microns. Although sulfanilic acid is almost instantaneously soluble in room temperature water, the coated particles of this example showed only about 2 percent leaching after 5 hours and about 20 percent after 5 days. On the other hand, when placed in water at 212° F. the encapsulated sulfanilic acid powder was nearly half leached after 1 hour and over 99 percent leached after 7 hours. It was found that the rate of leaching could be accurately controlled by varying the thickness of the applied coating. The coating, a polyurea, was resistant to all common organic solvents. The encapsulated sulfanilic acid proved useful, in conjunction with sodium bicarbonate, in providing a means for foaming resins, the gradual release of the acid permitting the resin to partially cure before the release of carbon dioxide. The encapsulated acid could also be used in the curing of ureaformaldehyde resins.

Example 2

This example shows the encapsulation of an amine to form a latent curing agent for epoxy resins which remains inert at normal storage conditions but becomes rapidly available at elevated temperatures.

Orthophenylene diamine particles having a diameter of approximately 30-40 microns were coated with a polyurea in the same manner described in Example 1 to provide a shell thickness of approximately 2-3 microns. The encapsulated amine particles were extremely resistant to acetone, showing a leaching rate at room temperature of 0.3 percent in 4 hours and only 1.3 percent in 24 hours. Approximately 18 percent by weight of the encapsulated amine was placed within a liquid epoxy resin (Shell "Epon 828"), which showed no tendency to gel after storage for 1 year, whereas the same amount of unencapsulated amine caused gelling of the epoxy resin in approximately 12 —hours at room temperature. When the epoxy resin containing the encapsulated amine was heated to 300° F., gellation occurred within 4-6 minutes, substantially the same rate as for unencapsulated orthophenylene diamine.

Example 3

Particles of dianisidine diisocyanate having a diameter in the range of 75-100 microns were encapsulated in polyurea in the manner described in the preceding examples. 2 parts of the encapsulated diisocyanate were placed in 1 part of adipic acid in ethyl alcohol solution and stored for over 2 weeks with no sign of gellation. In the absence of the capsule shell, gellation occurred within 3 minutes. When the alcohol solution containing the encapsulated diisocyanate and adipic acid was heated to drive off the solvent at a temperature 130° C., the system cured in 30 minutes, substantially the same rate as for an unencapsulated diisocyanate.

Example 4

Oxalic acid was ground and screened to a particle size in the range of 44-75 microns and supplied to apparatus of the type shown in FIG. 1. Nitrogen gas, at approximately 2 inches of water pressure, was introduced into plenum chamber 15 and used to fluidize 100 parts of the oxalic acid powder 13. Refrigerated titanium tetrachloride liquid was placed in retort 16 and a mixture of $NH_4OH$ and water placed in retort 20 with approximately 1 cubic foot of dry nitrogen gas per minute passing through plenum 15 and up through the bed of fluidizied oxalic particles 13. Approximately one-fourth cubic foot per minute of dry nitrogen gas was passed over the titanium tetrachloride, evaporating some of the liquid $TiCl_4$- bearing and the stream of gas admitted to fluidized bed 13. Simultaneously approximately one-fourth cubic foot per minute of dry nitrogen gas was passed over the water and ammonia, evaporating some of both, and the vapor-bearing stream of gas admitted to the opposite side of fluidized bed 13. In this process it is believed that the titanium tetrachloride reacts with water to yield, ultimately, a titanium oxide, part of the byproduct hydrochloric acid gas reacting with the $NH_4OH$ to form finely divided $NH_4Cl$, which was codeposited with the Titania. The remaining HCl was carried out of the reaction chamber by the nitrogen gas. It is hypothesized that this reaction takes the following course:

$TiCl_4 + H_2O$  $H_3TiClO_3 + 3HCl$
$H_3TiClO_3 + NH_4OH$  $H_4TiO_4 + NH_4Cl$
$H_4TiO_4 + 4TiCl_4$  $Ti[OTiCl_3]_4 + 4HCl$
$Ti[OTiCl_3]_4 + 12H_2O + 4NH_3$  $[TiOTiO_3H_3]_4 + 12HCl$, etc.

to form a continuous coating. It appears that linear polymerization continues, with some cross-linking occurring as oxygen bridges replace the OH groups in adjacent chains. The resultant polymer is resistant to most organic solvents but is somewhat sensitive to water. Omission of the $NH_3$ results in a structure containing residual chlorine but otherwise similar in character. Silicon tetrachloride, which may be substituted for the titanium tetrachloride, is somewhat easier to work with and, since the four chlorine atoms are nearly equal in reactivity, seems to leave no residual chlorine in the finished polymer. This polymer is less water-sensitive than the one made with $TiCl_4$ but it is somewhat more susceptible to attach by organic solvents.

Inorganic polymeric coatings, such as polymeric titanium dioxide, have previously been prepared by hydrolyzing $TiCl_4$ in the presence of alkali to form titanic acid and then dehydrating the acid at elevated temperatures. The process of the present invention is simpler and, since high temperatures need not be employed, a wider variety of substrates can be coated. Further, since no dehydration is involved, it is inferred that the resultant coating is less porous.

In the foregoing example 4, 50.5 parts of titanium tetrachloride and 32.7 parts each of $H_2O$ and $NH_3$ were supplied to 100 parts of oxalic acid, 144.5 parts of encapsulated product resulting. The encapsulated product seemed impervious to acetone even after several days of exposure. The product was free flowing, free of agglomeration, and 20 parts of freshly made capsules were incorporated in 80 parts of epoxidized polybutadiene ("Oxiron 2,000") resin without causing gellation, even after several months at room temperature. When heated to 300° F. gellation occurred within 10 minutes, substantially the same time as if the oxalic acid had not been encapsulated. Curing may also be triggered by adding a small amount of water.

The preceding examples of encapsulating particles for use in curing various polymers are only illustrative, and a wide variety of other solid curing agents may be similarly employed; for example, ammonium chloride particles may be encapsulated and added to urea-formaldehyde resins, paraformaldehyde may be encapsulated and added to phenol-formaldehyde resins having a low formaldehyde:phenol ratio, and so on.

The processes described in the preceding examples may be used to coat a surprising number of powdered materials. Despite conditions for generation of static electricity, I have not observed the agglomeration or flow patterns caused by accumulation of charges, regardless of what particles or encapsulating polymer have been employed. The coating method of this example is effective with particles which are 15 microns or less in diameter. Further, I have found it possible to work with materials which are normally not considered fluidizable, for example, wax, low molecular weight or low melting materials, hygroscopic materials, etc. I find that after only a few moments of exposure to the coating process described in the preceding examples, the particles have been provided with a shell which essentially eliminates static electricity problems and permits ready movement of the particles. This shell, which was not deposited from solution, is free from holes through which solvent has escaped. Likewise, the shell is of uniform, controllable thickness, a feature absent from prior art encapsulation methods.

Adjustments in procedure will, of course, be made to adapt the process to the specific circumstances. For example, if amine particles are to be incorporated in a polyurea, the initial ratio of diisocyanate to diamine should exceed the stoichiometric value; likewise, if diisocyanates are to be encapsulated in a polyurea, the diamine coreactant should be initially in excess. It appears that the rate of shell thickness increase is essentially independent of particle size.

Large scale reactions make it less essential to dilute the vapors of the monomeric coreactants, provided the equipment is maintained at a temperature high enough to prevent inadvertent condensation and provided that proper stoichiometric relationship is maintained. Similarly, although the fluidized bed coater represents a convenient technique for encapsulating particles, it is possible to use other kinds of mixing devices which provide thorough circulation of the particles throughout the bed. Such processes are, however, somewhat more sensitive and require careful control

Example 5

A strip of copper approximately 0.02 inch thick, 6 inches wide and 20 inches long was affixed to the periphery of a rotating plastic cylinder 32 as shown in FIG. 2. A 99:1 nitrogen:toluene 2,4-diisocyanate gas blend was introduced at inlet port 34 under 2 p.s.i., while a 99:1 nitrogen: ethylene diamine gas blend was introduced at inlet port 36 under 2 p.s.i. A vacuum of approximately 10 inches of mercury was applied at both exhaust port 35 and exhaust port 37. (Although not absolutely necessary, the vacuum facilitates the formation of a uniform polymer on the surface by removing unreacted monomer.) Cylinder 32 was rotated at 100 r.p.m. for 3 minutes, after which it was found that the copper had been coated with a 3-micron layer of polyurea weighing about 50 —milligrams. When examined in cross section under the electron microscope it was found that this coating was amazingly uniform in thickness and free from pinholes. When the coated copper strip was placed in a research laboratory for 1 year, where it was exposed to vapors of a wide variety of corrosive materials, the appearance of the coated side remained bright and unchanged; the opposite uncoated side was badly corroded and discolored. Samples of copper coated in the manner described in this example to thicknesses of 0.1, 0.5, 1, 2, and 5 microns, were exposed for 50 hours in a standard salt spray test (ASTM B117–62) with essentially no sign of corrosion, although the overall appearance of the copper having the 0.2 micron coating was not so attractive as that of samples having a greater thickness. In contrast, an uncoated strip of copper is badly corroded in the salt spray test in as little as 1 hour.

In applying coatings to a substrate in accordance with this example, I have found that thickness and uniformity of the in situ-formed coating can be constantly—and extremely precisely—monitored with an interferometer. I am completely unaware of any heretofore known commercially feasible means of applying an equivalent polymeric coating to yield the results achieved in this simple piece of equipment, which did not require high vacuum, elevated temperature, or electrical discharge equipment. Insofar as I am aware the best available roll coating methods produce films no thinner than 2½ microns, and even then the films are of erratic thickness and continuity.

Since the reactions of the ethylene diamine and toluene 2,4-diisocyanate are almost instantaneous, it appears that the rate of polyurea coating deposition in the equipment just described is directly proportional to the speed of rotation. It is also apparent that the same results could be achieved with a linear arrangement where a continuous sheet of material was cyclically exposed to the two coreactants with intervening evacuation of the excess vapors or flushing it away with nitrogen diluent.

Example 6

Aluminum foil was provided with a polyurea coating in the same manner described in the preceding example. A 1 micron coating effectively protected the foil for a 50 hour exposure to a salt spray test. It was further discovered that the electrical resistance of a film as thin as 0.2 micron was excellent, indicating the absence of pinholes. The product had utility in the manufacture of capacitors. The same type of treatment can be applied, with the same effective results, to films of polyvinyl acetate, polyvinyl chloride, polytetrafluoroethylene, cellophane, polyvinyl fluoride, polychlorotrifluoroethylene, cellulose acetate, polyvinylidene chloride, polyethylene, polypropylene, polyvinyl alcohol and the like. Many unique results may be attained with such products; to illustrate, polyvinyl alcohol film packets of soap or bleach powder may be sealed to greatly inhibit moisture transmission and product caking without destroying the film's ability to dissolve in a washing machine. Inexpensive food wrappers with extremely low moisture vapor transmission may be made by similarly sealing cellophane. Films of cellulose acetate, polyesters, or polyamides may likewise be rendered receptive to adhesives or coatings by suitable microcoatings. If desired, the substrate can be dissolved away, leaving a unique self-supporting film of polymer; Titania or silica films may be prepared in the same manner. Such films may be used in miniaturized electrical circuitry; e.g. a polyurea film may be provided with a printed circuit, coated with polymer, a second circuit printed on the second polyurea layer, and so on, to yield a compact stacked set of circuits. Likewise such films may be used in the manufacture of high-capacitance condensers. Films of suitable refractive index may be applied to windows, lenses, or mirrors to reduce glare.

Example 7

Biaxially oriented polyethylene terephthalate film was coated in the equipment shown in FIG. 2, titanium tetrachloride vapor being introduced at inlet port 34 and a mixture of ammonia and water vapor being introduced at inlet port 36. It was found that a film having a thickness of only 0.02 micron increased the surface conductivity of the polyester film by a factor of 1,000,000, i.e., from $4.07 \times 10^{115}$ to $2.62 \times 10^{19}$ ohm per square centimeter. This increase in conductivity is sufficiently great to essentially eliminate any static electricity problem in connection with automobile seats, rugs, etc., even in low humidity winter conditions.

Example 8

A strip of polyester tape 0.001 inch thick, one-half inch wide, and 60 inches long and having a one-fourth micron thick vapor-deposited metal on one surface was wound, metallic surface out, around a drum in an apparatus of the type shown in FIG. 2. This drum was rotated at 60 r.p.m. and the metallic surface alternately exposed to vapors of toluene 2,4-diisocyanate and ethylene glycol, the latter containing one-half–1 percent ethylene diamine to catalyze the reaction. After 30 seconds the process was stopped. The tape was removed and examined with an electron microscope. It was found to have a ¼ micron polyurethane coating. This thin polyurethane coating provided good abrasion protection and antiblocking for the thin metallic surface.

Example 9

A strip of 30lb. kraft paper was coated with polyurea using the equipment described in FIG. 2 in accordance with example 5 except that the equipment was heated to about 100° F. to minimize excessive condensation and insure adequate penetration between and around the fibers. Although the weight pickup of polyurea was approximately 1 percent based on the paper, the resultant product retained essentially the same porosity as measured on a Gurley Densometer in accordance with ASTM Test D–202–61AT. It was, however, almost completely waterproof, and could be immersed in room temperature water for several hours with no noticeable effect. It appears that instead of forming a film in this particular situation, the polyurea tends to form a coating around individual fibers. The tensile strength of the paper is increased and it is probable that similar paper products can find use as disposable replacements for cloth in clothing such as laboratory smocks, raincoats, white shirts, etc., the minute amount of coating having no significant effect on repulpability. Non-woven sheets other than paper may be similarly coated.

Cloth may also be treated in accordance with this example to yield a stain-resistant washable textile. Glass cloth or yarns may be treated to reduce interfilament abrasion.

Example 10

A total of 1000 grams of steel washers, bolts, nuts, etc. was placed in a 2000 cc. jar which was heated to 100° 10and cyclically flushed with the following gases: 99:1 nitrogen:toluene 2,4-diisocyanate, nitrogen,—99:1 triamine, and nitrogen until approximately 1–2 microns of poly(2,4-tolylene)-(imino bis ethyl) urea had been coated on the parts. Throughout the coating operation the parts are desirably agitated sufficiently to eliminate "dead" spots where the vapors penetrate only with difficulty. After 50 hours of exposure to the salt spray test previously described, the parts showed no noticeable rusting.

The coated articles of this example were subjected to a somewhat more severe test in the following manner: an electrical clip was forced through the polyurea coating on a washer and the lower portion of the washer suspended in a sodium chloride solution. A magnesium anode was then suspended in the same solution, and an external battery connected in series with a millimeter connected across the two electrodes. Whereas a current flow of 0.8 milliampere was obtained with an untreated washer, no current flow whatsoever occurred with a washer coated in accordance with this example. In the same manner, copper sheets, aluminum sheets, and even magnesium sheets can be provided with a corrosion-resistant coating.

The foregoing examples are intended only to be illustrative, and numerous other compounds may be used. For example, in the manufacture of polyurea coatings in accordance with my invention, one may employ aromatic, aliphatic or heterocyclic compounds containing reactive amine groups; illustrative of such compounds are ethylene, diamine, 1,3-propane diamine, 1,3-diaminopropanol-2, tetramethylene diamine, hexamethylene diamine, 1,4-diaminocyclohexane, o, m, or p-phenylene diamine, 2,4- or 2,6-toluene diamine, diethylene triamine, triethylene tetramine, iminobisporpylamine, piperazine, and the like. One may likewise employ aromatic, aliphatic, or heterocyclic compounds containing a plurality of isocyanate groups; illustrative of such compounds are hexamethylene diisocyanate, bis-(2-isocyanatoethyl)-carbonate, o, m,or p -phenylene diisocyanate, 2,4- and 2,6-toluene diisocyanate, 1-chloro-2,-4-phenylene diisocyanate, and the like. For convenience and safety, it is greatly preferred to employ compounds which have a vapor pressure of at least 4 mm. of mercury at 200° C. and atmospheric pressure.

Example 11

A sheet of aluminum foil approximately 6½feet by 6 2-4,was affixed to the feed rolls a vapor coating apparatus of the linear configuration as shown in FIG. 3 consisting of 20 alternate heated tubes, every other tube containing 2-4,toluene diisocyanate heated to 140° C. with the remaining alternate tubes containing metaphenylene diamine heated to 170° C. The aluminum sheet was repeatedly passed over the tubes, at 70.8 feet per minute, for 10 minutes. While an uncoated control sheet of aluminum foil showed instantaneous pitting and gas evolution by attack of either concentrated hydrochloric acid or 10 percent sodium hydroxide, the coated samples of this example did not reach the same degree of corrosion until 25 minutes under acid attack and 30 minutes under base attack. Polyurea coatings with this apparatus have been made using various feed reactant combinations such as hexamethylene diisocyanate hexamethylene diamine, toluene diisocyanate hexamethylene diamine and toluene diisocyanate diethylene triamine. The use of a linear configuration makes possible roll fed application of these coatings with coating thickness determined by a combination of web speed, number of alternating tubes and reactant feed temperatures.

I find that the temperature sensitivity of polymeric coatings made in accordance with my invention is on the order of perhaps 80° C. above the processing temperature. In other words, where the coatings are made at 20° C., they disrupt at about 100° C. By carrying out the process, at, e.g., −20° C., the coatings become thermally unstable at about 60° C. Likewise, where the processing temperature is significantly above room temperature, the temperature at which the film thermally disrupts is correspondingly increased. This feature can be exploited in various ways; e.g., by separately encapsulating, and then blending, two colorless compounds which have a low melting point and which react to form a dye, it is possible to create a paint or coating which changes color when heated to a predetermined temperature.

What I claim is:

1. The process of providing a shaped substrate with a uniform dense protective organic polyurea or polyurethane coating comprising repeatedly alternately exposing said substrate to (1) vapors of a first compound having a plurality of reactive isocyanate groups and (2) the vapors of a second compound having a plurality of radicals which are highly reactive with said isocyanate groups, said compound being selected from the group consisting of alcohols and amines, thereby forming a polymer in situ, and continuing the cycle until a polymeric coating of the desired thickness has been built up.

2. The process of claim 1 wherein the first compound is a diisocyanate.

3. The process of claim 2 wherein the diisocyanate is toluene diisocyanate.

4. The process of encapsulating individual solid particles in a uniform dense organic polyurea or polyurethane shell comprising suspending said particles in a fluidized bed by directing a stream of inert gas upward through a mass of said particles, introducing into said bed a stream of vapors of a first compound having a plurality of isocyanate groups reactive with the surface of said particles, and simultaneously introducing into a different location in said bed a stream of vapors of a second compound having a plurality of radicals which are highly reactive with said isocyanate groups, said compound being selected from the group consisting of alcohols and amines, said vapor streams being so directed that said particles are circulated throughout the bed in a manner exposing them to the two vapor streams alternately, and continuing the process until a polymeric shell of the desired thickness has been built up on said particles.

5. The process of providing a shaped substrate with a uniform dense organic polyurea or polyurethane coating comprising placing said substrate in a chamber, introducing into said chamber and in contact with the surface of said substrate to be coated the vapors of a first compound having a plurality of isocyanate groups reactive with said substrate, flushing out the unreacted vapors of said first compound with an inert gas, introducing into said chamber and in contact with the previously treated surface of said substrate the vapors of a second compound having a plurality of radicals which are rapidly reactive with said isocyanate groups, said compound being selected from the group consisting of alcohols and amines, flushing out the unreacted vapors of said second compound with an inert gas, and repeating the cycle until a polymeric coating of the desired thickness has been built up on said substrate.

6. The process of providing sheet material with a uniform dense organic polyurea or polyurethane coating comprising transporting said sheet material past a plurality of stations where it is repeatedly exposed alternately to (1) the vapors of a first compound having a plurality of isocyanate groups reactive with the surface of said sheet material and (2) the vapors of a second compound having a plurality of radicals which are highly reactive with said isocyanate groups, said compound being selected from the group consisting of alcohols and amines, removing unreacted vapors of each of said compounds before exposing to the vapors of the other of said compounds, and continuing the treatment until a coating of the desired thickness has been built up on said sheet material.

7. The process of providing a shaped substrate with a uniform dense protective polymeric coating comprising repeatedly alternately exposing said substrate to (1) the vapors of an aromatic diisocyanate and (2) the vapors of a diamine, thereby forming a polymer in situ, and continuing the cycle until a polymeric coating of the desired thickness has been built up.

8. The process of claim 7 wherein the diamine is ethylene diamine.

9. The process of claim 7 wherein the diamine is diethylene triamine.

10. The process of providing a shaped substrate with a uniform dense protective polymeric coating comprising repeatedly alternately exposing said substrate to (1) the vapors of a first compound selected from the group consisting of $SiCl_4$ and $TiCl_4$ and (2) the vapors of $NH_4OH$, thereby forming a polymer in situ, and continuing the cycle until a polymeric coating of the desired thickness has been built up.

UNITED STATES PATENT OFFICE
CERTIFICATE OF CORRECTION

Patent No. 3,607,365     Dated September 21, 1971

Inventor(s) James A. Lindlof

It is certified that error appears in the above-identified patent and that said Letters Patent are hereby corrected as shown below:

Column 2, line 28, the word "be" should be changed to --supplied--.

Column 2, line 47, delete "!".

Column 7, line 28, "4.07 x $10^{115}$" should be changed to read --4.07 x $10^{-15}$--.

Column 7, line 29, "2.62 x $10^{19}$" should be changed to read --2.62 x $10^{-9}$--.

Column 8, line 2 "100° 10" should be changed to read --100° C.--.

Column 8, line 36, "iminobisporpylamine" should be changed to read --iminobispropylamine--.

Column 8, line 48-49, "6-1/2 feet by 6 2-4," should be changed to read --6-1/2 feet by 6 inches--.

Signed and sealed this 11th day of April 1972.

(SEAL)
Attest:

EDWARD M. FLETCHER, JR.         ROBERT GOTTSCHALK
Attesting Officer                Commissioner of Patents